United States Patent
Park et al.

(10) Patent No.: US 11,198,779 B2
(45) Date of Patent: Dec. 14, 2021

(54) PROPYLENE-BUTENE COPOLYMER RESIN COMPOSITION AND METHOD OF PREPARING THE SAME

(71) Applicant: LG Chem, Ltd., Seoul (KR)

(72) Inventors: Hee Kwang Park, Daejeon (KR); Kyung Seop Noh, Daejeon (KR); Sang Jin Jeon, Daejeon (KR); Hyunsup Lee, Daejeon (KR); In Sun Lee, Daejeon (KR); Jin Hyun Park, Daejeon (KR); Changkwon Chung, Daejeon (KR)

(73) Assignee: LG Chem, Ltd.

( * ) Notice: Subject to any disclaimer, the term of this patent is extended or adjusted under 35 U.S.C. 154(b) by 154 days.

(21) Appl. No.: 16/616,168

(22) PCT Filed: Jul. 11, 2018

(86) PCT No.: PCT/KR2018/007873
§ 371 (c)(1),
(2) Date: Nov. 22, 2019

(87) PCT Pub. No.: WO2019/013554
PCT Pub. Date: Jan. 17, 2019

(65) Prior Publication Data
US 2020/0207968 A1 Jul. 2, 2020

(30) Foreign Application Priority Data
Jul. 11, 2017 (KR) .................. 10-2017-0087999

(51) Int. Cl.
*C08F 210/06* (2006.01)
*C08F 210/08* (2006.01)
*C08F 4/6592* (2006.01)
*C08L 23/20* (2006.01)

(52) U.S. Cl.
CPC .......... *C08L 23/20* (2013.01); *C08F 4/65927* (2013.01); *C08F 210/06* (2013.01); *C08F 210/08* (2013.01)

(58) Field of Classification Search
CPC .................. C08F 210/06; C08F 4/65927
See application file for complete search history.

(56) References Cited

U.S. PATENT DOCUMENTS

| | | |
|---|---|---|
| 2006/0008643 A1 | 1/2006 | Lin et al. |
| 2008/0220193 A1 | 9/2008 | Tohi et al. |
| 2012/0149827 A1 | 6/2012 | Hu et al. |
| 2014/0171586 A1 | 6/2014 | Hu et al. |
| 2015/0274907 A1 | 10/2015 | MacDonald et al. |
| 2015/0322302 A1 | 11/2015 | Hu et al. |
| 2016/0251460 A1 | 9/2016 | Noh et al. |
| 2016/0280819 A1 | 9/2016 | Tohi et al. |
| 2018/0148615 A1 | 5/2018 | Hu et al. |
| 2018/0237560 A1 | 8/2018 | Noh et al. |

FOREIGN PATENT DOCUMENTS

| | | |
|---|---|---|
| EP | 1879953 A2 | 1/2008 |
| EP | 3078681 A1 | 10/2016 |
| JP | H10120845 A | 5/1998 |
| JP | H10338778 A | 12/1998 |
| JP | 2002105828 A | 4/2002 |
| JP | 2002235237 A | 8/2002 |
| KR | 19980017267 A | 6/1998 |
| KR | 101008358 B1 | 1/2011 |
| KR | 20120051742 A | 5/2012 |
| KR | 101169179 B1 | 7/2012 |
| KR | 20150037653 A | 4/2015 |
| KR | 20150052804 A | 5/2015 |
| KR | 20150081443 A | 7/2015 |
| KR | 20170056462 A | 5/2017 |
| KR | 1020170075623 A | 7/2017 |
| WO | 98017722 A1 | 4/1998 |
| WO | 2010057841 A1 | 5/2010 |

OTHER PUBLICATIONS

International Search Report from Application No. PCT/KR2018/007873 dated Oct. 29, 2018, pp. 1-2.
Extended European Search Report including the Written Opinion for Application No. EP 18832078.2 dated Apr. 20, 2020, 11 pages.

*Primary Examiner* — Caixia Lu
(74) *Attorney, Agent, or Firm* — Lerner, David, Littenberg, Krumholz & Mentlik, LLP

(57) ABSTRACT

The present invention relates to a propylene-butene copolymer resin composition used for non-woven fabric, a method of preparing the same, and spunbond non-woven fabric manufactured using the composition, and particularly, by optimizing a content of 1-buttene in a metallocene polypropylene resin composition to 0.5 to 5.0 wt %, while simultaneously optimizing both of a melt index and a residual stress ratio of the resin composition, has a merit of having a reduced modulus together with a high conversion rate to manufacture non-woven fabric which is softer than existing products while maintaining high strength.

20 Claims, No Drawings

PROPYLENE-BUTENE COPOLYMER RESIN COMPOSITION AND METHOD OF PREPARING THE SAME

CROSS-REFERENCE TO RELATED APPLICATION

This application is a national phase entry under 35 U.S.C. § 371 of International Application No. PCT/KR018/007873, filed Jul. 11, 2018, which claims priority to Korean Patent Application No. 10-2017-0087999, filed Jul. 11, 2017, the entire contents of which are incorporated herein by reference.

TECHNICAL FIELD

The present invention relates to a propylene-butene copolymer resin composition used as non-woven fabric, a method of preparing the same, and a spunbond non-woven fabric manufactured using the resin composition.

BACKGROUND ART

Generally, non-woven fabric is manufactured by bonding or entangling a fiber aggregate by mechanical or chemical treatment such as a machine operation or thermal bonding, without a spinning, weaving, or knitting process. Felt, resin-bonded non-woven fabric, needle punched, spunbond, spunlace, emboss film, wet non-woven fabric, and the like belong to the non-woven fabric. In a limited sense, non-woven fabric refers to bonding a contact point of randomly overlapping web and fiber by a resin to be used as an interlining and the like. The non-woven fabric is also called bonded fabric. The non-woven fabric may be manufactured by various methods, and a needle punching method, a chemical bonding method, a thermal bonding method, a melt blown method, a spunlace method, a stitch bond method, and a spunbond method are known as methods thereof.

The spunbond non-woven fabric obtained by using a polyolefin-based resin as a raw material has excellent tactility, flexibility, air permeability, thermal insulation, and the like, thereby being widely used for a filter, packing materials, bedding, clothing, medical supplies, hygiene products, car interior materials, building materials, and the like. In particularly, polypropylene staple fiber is processed into thermal bond non-woven fabric by a calendar bonding method or an air-through bonding method, due to a specific melting point and excellent chemical resistance, and is mainly used as a surface material of hygiene products such as diapers and sanitary napkins.

Japanese Patent Laid-Open Publication No. 2002-235237 discloses a polypropylene heat-sealable non-woven fabric in which, for imparting soft tactility and high tensile strength to the non-woven fabric, a metal salicylate as a crystallization inhibitor was added to a masterbatch pellet to impart a softness property and high tensile strength by small fineness. However, it discloses an experiment for spunbond non-woven fabric, of which the manufacturing method is different from that of a thermal bond non-woven fabric by staple fiber. In addition, it is known that the spunbond non-woven fabric has high tensile strength, but has poor softness tactility as compared with a stable fiber thermal bond non-woven fabric.

Meanwhile, unlike a homopolypropylene resin prepared with a conventional Ziegler-Natta catalyst, a homopropylene resin prepared with a metallocene catalyst has a narrow molecular weight distribution, thereby having merits in that fiber having a thin and uniform thickness may be prepared, and thus, non-woven fabric of a low basis weight having excellent strength is manufactured. However, a metallocene homopolypropylene resin has the low content of a polymer having low molecular weights due to low xylene solubility (xylene solubles) or a narrow molecular weight distribution, thereby having a drawback of giving rough tactility (feel) with a surface area when manufacturing non-woven fabric.

DETAILS OF THE INVENTION

Objects of the Invention

The present invention has been made in an effort to provide a propylene-butene copolymer resin composition having advantages of imparting softer tactility than existing products when used in non-woven fabric, by optimizing a content of 1-butene and a correlation between a melt index and a residual stress ratio to decrease a modulus, and a method of preparing the same.

Means for Achieving the Object

An exemplary embodiment of the present invention provides a propylene-butene copolymer resin composition, wherein a content of 1-butene is 0.5 to 5.0 wt %, and a melt index (MI, X) and a residual stress ratio (Y) satisfy the following Calculation Formula 1:

$$0.25*EXP(-0.115*X) < Y < 0.50*EXP(-0.115*X) \quad \text{[Calculation Formula 1]}$$

wherein

X is a melt index (MI) measured at 230° C. under a load of 2.16 kg according to ASTM D 1238, and Y is a residual stress ratio obtained according to the following Calculation Formula 2:

$$\text{Residual stress ratio } (Y) = (RS_1/RS_0)*100 \quad \text{[Calculation Formula 2]}$$

wherein $RS_0$ is residual stress at any one point (to) within 0.05 seconds after applying strain at 200% to the resin composition at 235° C., and $RS_1$ is residual stress at any one point ($t_1$) between 0.05 seconds and 1.50 seconds after applying strain at 200% to the resin composition at 235° C.

As an example, the propylene-butene copolymer resin composition may have a melt index (MI, X) of about 12 to 37 g/10 min, a residual stress ratio (Y) of about 0.005% to 0.085%, a molecular weight distribution (MWD) of 2.6 or less, and a melting point of 148° C. or less.

Another embodiment of the present invention provides a method of preparing the propylene-butene copolymer resin composition, including: polymerizing propylene and 1-butene at a weight ratio of 99:1 to 90:10, in the presence of a catalyst including a transition metal compound represented by the following Chemical Formula 1, thereby preparing a propylene-butene copolymer:

[Chemical Formula 1]

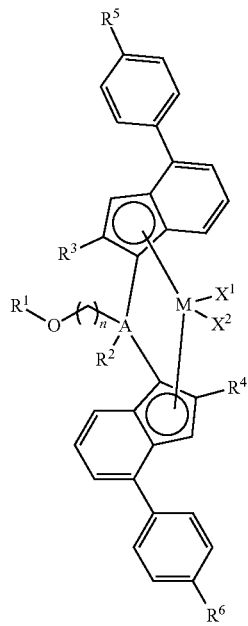

[Chemical Formula 2]

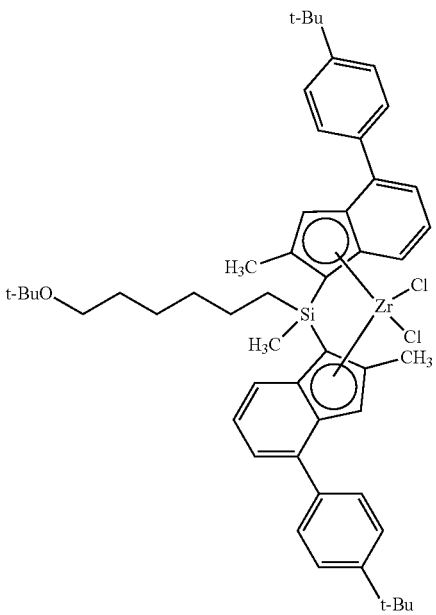

wherein

M is any one of Group 3 transition metals, Group 4 transition metals, Group 5 transition metals, lanthanide series transition metals, and actinide series transition metals;

$X^1$ and $X^2$ are identical to or different from each other, and are, independently of each other, any one of halogens;

A is any one of Group 14 elements;

n is an integer of 1 to 20;

$R^1$ is any one of alkyls having 1 to 20 carbon atoms, alkenyls having 2 to 20 carbon atoms, alkylaryls having 7 to 30 carbon atoms, arylalkyls having 7 to 30 carbon atoms, and aryls having 6 to 30 carbon atoms;

$R^2$ is any one of hydrogen, alkyls having 1 to 20 carbon atoms, alkenyls having 2 to 20 carbon atoms, alkylaryls having 7 to 30 carbon atoms, arylalkyls having 7 to 30 carbon atoms, and aryls having 6 to 30 carbon atoms; and $R^3$ to $R^6$ are, independently of each other, any one of alkyls having 1 to 20 carbon atoms.

As an example, in Chemical Formula 1 regarding the transition metal compound, $R^3$ and $R^4$ may be, independently of each other, any one of linear alkyls having 1 to 3 carbon atoms, $R^5$ and $R^6$ may be, independently of each other, any one of branched alkyls having 3 to 6 carbon atoms, $R^1$ may be any one of branched alkyls having 3 to 6 carbon atoms, $R^2$ may be any one of linear alkyls having 1 to 3 carbon atoms, M may be any one of Group 4 transition metals, and n may be an integer of 3 to 9.

Further, the transition metal compound may be represented by the following Chemical Formula 2.

Yet another embodiment of the present invention provides spunbond non-woven fabric manufactured by a melt spun process using the propylene-butene copolymer resin composition.

As an example, the spunbond non-woven fabric may have a Handle-O-Meter measurement value in a machine direction (MD) of the non-woven fabric of about 7.5 g or less, and a Handle-O-Meter measurement value in a cross direction (CD) of the non-woven fabric of about 4.0 g or less. In addition, the spunbond non-woven fabric may have tensile strength of about 1600 gf or more, as measured in a machine direction (MD) of the non-woven fabric according to the method of ASTM D-5035, and tensile strength of about 730 gf or more, as measured in a cross direction (CD) of the non-woven fabric according to the method of ASTM D-5035. The Handle-O-Meter and tensile strength are the values measured under the condition of a non-woven fabric basis weight of 13 to 17.5 g/m².

Effects of the Invention

The propylene-butene copolymer resin composition according to the present invention has a decreased modulus by optimizing a content of 1-butene in a metallocene propylene resin to 0.5 to 5.0 wt %, while simultaneously optimizing a correlation between a melt index and a residual stress ratio of the resin composition to a predetermined range, thereby being capable of providing a softer non-woven fabric than the existing product.

DETAILED DESCRIPTION OF THE EMBODIMENTS

Hereinafter, the propylene-butene copolymer resin composition according to specific embodiments of the present invention, and a method of preparing the same, will be described.

The terminology used in the present specification is only for mentioning a specific embodiment, and is not intended to limit the present invention. Further, a singular form used herein also includes a plural form, unless the wordings clearly express the opposite meaning thereto. In addition, the meaning of 'comprising' or 'containing' used in the present specification embodies a certain characteristic, range, essence, step, motion, element, or component, but does not exclude addition of other certain characteristics, ranges, essences, steps, motions, elements, or components.

In the present invention, terms such as first and second are used for describing various constituent elements, and are only used for distinguishing one constituent element from other constituent elements.

In addition, the terms used in the present specification are only used for describing illustrative examples, and are not intended to limit the present invention. A singular expression includes a plural expression, unless otherwise clearly contextually meant. In the present specification, a term such as "comprise", "fulfill", or "have" should be understood as designating the existence of implemented features, numbers, steps, constituent elements, or a combinations thereof, without excluding in advance the existence or addition of one or more other features, numbers, steps, constituent elements, or combinations thereof.

Since the present invention may be variously modified and have various forms, specific exemplary embodiments will be illustrated and described in detail in the following. However, this should not be understood as limiting the present invention to a specific disclosed form, but rather includes all changes, equivalents, or alternatives falling within the spirit and technical scope of the present invention.

Hereinafter, the present invention will be described in detail.

According to an embodiment of the present invention, a propylene-butene copolymer resin composition is provided, wherein a content of 1-butene (C4) is 0.5 to 5.0 wt %, and a melt index (MI, X) and residual stress ratio (Y) satisfy the following Calculation Formula 1:

$$0.25*EXP(-0.115*X) < Y < 0.50*EXP(-0.115*X) \quad \text{[Calculation Formula 1]}$$

wherein

X is a melt index (MI) measured at 230° C. under a load of 2.16 kg according to ASTM D 1238, and Y is a residual stress ratio obtained according to the following Calculation Formula 2:

$$\text{Residual stress ratio } (Y) = (RS_1/RS_0)*100 \quad \text{[Calculation Formula 2]}$$

wherein $RS_0$ is residual stress at any one point (t0) within 0.05 seconds after applying strain at 200% to the resin composition at 235° C., and $RS_1$ is residual stress at any one point ($t_1$) between 0.05 seconds and 1.50 seconds after applying strain at 200% to the resin composition at 235° C.

The present inventors confirmed in the course of studying a polypropylene resin composition used for non-woven fabric that since a previously known metallocene homopolypropylene resin has the low content of a polymer having low molecular weights due to a low xylene solubility (solubles) and a narrow molecular weight distribution, it has a drawback of giving rough tactility (feel) with a surface area when manufacturing non-woven fabric.

Thus, the present inventors confirmed in the course of repeated study for improving the problem that by optimizing a content of 1-butene to 0.5 to 5.0 wt %, and optimizing a correlation between a melt index and a residual stress ratio to decrease a modulus, a softer non-woven fabric than the existing product may be manufactured.

In general, it is known that when non-woven fabric is manufactured using a random (ethylene) polypropylene relative to homopolypropylene, there is a problem in that a softness property is increased, while strength is deteriorated. This is known to be due to the fact that unlike homopolypropylene, a different kind of comonomer is interposed between main chains to change a lamella structure of a resin. In the present invention, a merit in that not ethylene but 1-butene which is an α-olefin is used, whereby a different kind of comonomer is used to change a lamellar structure to increase a softness property, simultaneously with an excellent effect that unlike when using previously known ethylene, a decrease in strength is suppressed, thereby increasing only a softness property, based on similar strength to the conventional non-woven fabric using homopolypropylene, may be obtained.

Particularly, the propylene-butene copolymer resin composition according to the present invention uses a certain metallocene catalyst to include 1-butene in a predetermined content range, thereby implementing a low molecular weight distribution even in random polymerization at a high conversion rate, and manufacturing high-strength soft non-woven fabric with excellent fiber processability, as described below.

The propylene-butene copolymer resin composition according to the present invention may be used for manufacturing non-woven fabric, and uses a metallocene propylene resin to include 1-butene in an optimized content of about 0.5 wt % to about 5.0 wt %, about 0.5 wt % to about 3.5 wt %, or about 0.5 wt % to about 2.0 wt %. Here, the content of 1-butene should be about 0.5 wt % or more in terms of implementing a soft physical property, and about 5 wt % or less in terms of securing a resin melting point, so that the composition may be produced in a bulk polymerization process.

The propylene-butene copolymer resin composition of the present invention is characterized in that a melt index (X) and a residual stress ratio (Y) satisfy the above Calculation Formula 1, together with the optimized content of 1-butene, as described above.

In order to manufacture high-strength soft non-woven fabric, the melt index (X) and the residual stress ratio (Y) of the propylene-butene copolymer resin composition should be maintained in an optimized correlation, as represented by Calculation Formula 1. That is, the residual stress ratio (Y) of the propylene-butene copolymer resin composition should be a value of more than 25% of EXP(–0.115*X) and less than 50% of EXP(–0.115*X). Particularly, when the residual stress ratio (Y) of the propylene-butene copolymer resin composition is more than 50% of a value of EXP(–0.115*X) based on a melt index (X), processability is problematic to cause a yarn breaking and to give rough tactility (feel) with a surface area. Here, "EXP" represents an equation in the same manner as an exponential function, $e^x$ being generally represented as exp(x) in mathematics, that is, EXP(–0.115*X) corresponds to an exponential function, $e^{-0.115*X}$. In addition, when the residual stress ratio (Y) of the propylene-butene copolymer resin composition is less than 25% of a value of EXP(–0.115*X) based on a melt index (X), the strength is unduly lowered, so that the composition is not appropriate for non-woven fabric. The melt index (X) and the residual stress ratio (Y) of the propylene-butene copolymer resin composition satisfy Calculation Formula 1, whereby a softness property and an excellent strength property may be satisfied at the same time.

Here, the melt index (MI, X) of the propylene-butene copolymer resin composition may be about 12 to about 37 g/10 min, about 13 to about 35 g/10 min, about 15 to about 33 g/10 min, or about 22 to about 32 g/10 min, as measured at 230° C. under a load of 2.16 kg according to ASTM D 1238 which is a standard of the American Society for Testing and Materials (ASTM), as described in Calculation Formula 1. Here, the melt index (MI) may be about 12 g/10 min or more in terms of maintaining a molecular weight which may be processed into non-woven fabric, and about 37 g/10 min or less in terms of maintaining basic strength of non-woven fabric.

In addition, the residual stress ratio (Y) of the propylene-butene copolymer resin composition has lower limit and upper limit ranges based on a melt index (X), as represented by Calculation Formula 1. As described above, the residual stress ratio (Y) should be a value of more than 0.25*EXP(−0.115*X) in terms of maintaining strength by adjusting a ratio of low molecular weights, and a value less than 0.50*EXP(−0.115*X) in terms of not producing a yarn breaking by adjusting a ratio of high molecular weights.

Particularly, with the residual stress ratio (Y) of the propylene-butene copolymer resin composition, fiber processability may be confirmed by a rheological physical property test under a similar environment to that of a manufacturing process of non-woven fabric, and thus, high strain is applied to the resin composition and a stress relaxation test is performed to obtain a value measured according to Calculation Formula 2. For example, the residual stress ratio (Y) of the propylene-butene copolymer resin composition is a percentage of a ratio of residual stress values measured at $t_0$ and $t_1$ points $[(RS_1/RS_0)*100]$, in a stress relaxation test as described in Calculation Formula 2, which may be about 0.005% to 0.085%, about 0.0055% to 0.083%, about 0.006% to 0.08%, or about 0.0062% to 0.075%. That is, according to an exemplary embodiment of the present invention, in the case that the residual stress ratio according to Calculation Formula 2 is less than 0.005%, when a melt spun process for manufacturing non-woven fabric is performed using the resin composition as a raw material, a possibility of a yarn breaking may be lowered. On the contrary, in the case that the residual stress ratio according to Calculation Formula 2 is more than 0.085%, when a melt spun process is performed using the synthetic resin as a raw material, a possibility of a yarn breaking may be raised.

In Calculation Formula 2, $RS_0$ represents residual stress immediately [for example, at any one point within 0.05 seconds or between 0.001 seconds and 0.049 seconds] after applying strain at 200% to the propylene-butene copolymer resin composition at 235° C. Further, in Calculation Formula 2, $RS_1$ represents residual stress within about 1.5 seconds [for example, at any one point $t_1$ between 0.05 seconds and 2.00 seconds] after to under the same conditions as $RS_0$.

Specifically, in Calculation Formula 2, to may be selected from 0.01 seconds, 0.015 seconds, 0.02 seconds, 0.025 seconds, 0.03 seconds, 0.035 seconds, 0.04 seconds, and 0.045 seconds. Further, in Calculation Formula 2, $t_1$ may be selected from 0.05 seconds, 0.10 seconds, 0.20 seconds, 0.30 seconds, 0.40 seconds, 0.50 seconds, 0.60 seconds, 0.70 seconds, 0.80 seconds, 0.90 seconds, 1.00 second, 1.10 seconds, 1.20 seconds, 1.30 seconds, 1.40 seconds, 1.50 seconds, 1.60 seconds, 1.70 seconds, 1.80 seconds, 1.90 seconds, and 2.00 seconds.

Preferably, for easily securing valid data at the time of measuring residual stress, in Calculation Formula 2, it may be advantageous for $t_0$ to be 0.02 seconds and for $t_1$ to be 1.00 second.

In addition, the residual stress ratio (Y) of the propylene-butene copolymer resin composition is measured under a similar environment (e.g., 235° C.) to a process condition for performing a melt spun process at the time of manufacturing non-woven fabric. The temperature of 235° C. corresponds to a temperature that is appropriate for performing a melt spun process by completely dissolving the propylene-butene copolymer resin composition.

In the propylene-butene copolymer resin composition of the present invention, it is preferred that a molecular weight distribution (MWD) is not increased but is maintained within a low range, so that a residual stress ratio (Y) may be maintained in an optimal range as described above and excellent fiber processability may be secured. For example, the molecular weight distribution of the propylene-butene copolymer resin composition may be about 2.6 or less, 2.0 to about 2.6, about 2.05 to about 2.5, or about 2.1 to about 2.4.

The propylene-butene copolymer resin composition may have an optimized melting point (Tm), together with the residual stress ratio, the melt index, the molecular weight distribution, and the like, as described above. For example, the melting point (Tm) of the propylene-butene copolymer resin composition may be about 148° C. or less, about 130° C. to about 148° C., about 132° C. to about 146° C., or about 133° C. to about 145° C. The melting point (Tm) of the resin composition may be about 148° C. or less, in terms of a minimum content of 1-butene (C4) for manufacturing high-strength soft non-woven fabric being 0.5 wt %. However, in terms of securing a preferred resin form for manufacturing non-woven fabric, the melting point (Tm) of the propylene-butene copolymer resin composition may be about 130° C. or more.

Meanwhile, according to another embodiment of the present invention, a method of preparing the propylene-butene copolymer resin composition as described above is provided.

The method of manufacturing a propylene-butene copolymer resin composition includes a step of polymerizing propylene and 1-butene at a weight ratio of 99:1 to 90:10 in the presence of a catalyst including a transition metal compound represented by the following Chemical Formula 1 to prepare a propylene-butene copolymer:

[Chemical formula 1]

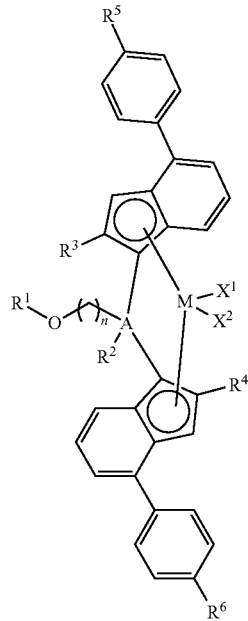

wherein

M is any one of Group 3 transition metals, Group 4 transition metals, Group 5 transition metals, lanthanide series transition metals, and actinide series transition metals;

$X^1$ and $X^2$ are identical to or different from each other, and independently of each other, are any one of halogens;

A is any one of Group 14 elements;

n is an integer of 1 to 20;

$R^1$ is any one of alkyls having 1 to 20 carbon atoms, alkenyls having 2 to 20 carbon atoms, alkylaryls having 7 to 30 carbon atoms, arylalkyls having 7 to 30 carbon atoms, and aryls having 6 to 30 carbon atoms;

$R^2$ is any one of hydrogen, alkyls having 1 to 20 carbon atoms, alkenyls having 2 to 20 carbon atoms, alkylaryls having 7 to 30 carbon atoms, arylalkyls having 7 to 30 carbon atoms, and aryls having 6 to 30 carbon atoms; and $R^3$ to $R^6$ are, independently of each other, any one of alkyls having 1 to 20 carbon atoms.

Particularly, the method of preparing a propylene-butene copolymer resin composition according to the present invention optimizes a weight ratio of 1-butene which is a comonomer, and at the same time includes a specific alkyl group and an alkyl-substituted phenyl group in an indene group as in Chemical Formula 1, and uses a transition metal compound containing a specific alkoxy-substituted alkyl group in a bridge group as a catalyst activating component, thereby improving productivity at a high conversion rate. In addition, with excellent fiber processability of the propylene-butene copolymer resin composition prepared according to the present invention, high-strength soft non-woven fabric may be effectively manufactured.

Unless otherwise limited in the present specification, the following terms may be defined as follows.

A halogen may be fluorine (F), chlorine (Cl), bromine (Br), or iodine (I).

A hydrocarbyl group is a monovalent functional group in the form in which a hydrogen atom is removed from a hydrocarbon, and may include an alkyl group, an alkenyl group, an alkynyl group, an aryl group, an aralkyl group, an aralkenyl group, an aralkynyl group, an alkylaryl group, an alkenylaryl group, an alkynylaryl group, and the like. Further, a hydrocarbyl group having 1 to 20 carbon atoms may be a hydrocarbyl group having 1 to 15 carbon atoms or a hydrocarbyl group having 1 to 10 carbon atoms. Specifically, the hydrocarbyl group having 1 to 20 carbon atoms may be a linear, branched, or cyclic alkyl group such as a methyl group, an ethyl group, an n-propyl group, an iso-propyl group, an n-butyl group, an iso-butyl group, a tert-butyl group, an n-pentyl group, an n-hexyl group, an n-heptyl group, and a cyclohexyl group; or an aryl group such as a phenyl group, a naphthyl group, and an anthracenyl group.

A hydrocarbyloxy group is a functional group in which a hydrocarbyl group is bonded to oxygen. Specifically, a hydrocarbyloxy group having 1 to 20 carbon atoms may be a hydrocarbyloxy group having 1 to 15 carbons, or 1 to 10 carbon atoms. More specifically, the hydrocarbyloxy group having 1 to 20 carbon atoms may be a linear, branched, or cyclic alkoxy group such as a methoxy group, an ethoxy group, an n-propoxy group, an iso-propoxy group, an n-butoxy group, an iso-butoxy group, a tert-butoxy group, an n-pentoxy group, an n-hexoxy group, an n-heptoxy group, and a cyclohexoxy group; or an aryloxy group such as a phenoxy group or a naphthaleneoxy group.

The hydrocarbyl(oxy)silyl group is a functional group in which 1 to 3 hydrogens of —$SiH_3$ are substituted by 1 to 3 hydrocarbyl groups or hydrocarbyloxy groups. Specifically, a hydrocarbyl(oxy)silyl group having 1 to 20 carbon atoms may be a hydrocarbyl(oxy)silyl group having 1 to 15 carbon atoms, 1 to 10 carbon atoms, or 1 to 5 carbon atoms. More specifically, the hydrocarbyl(oxy)silyl group having 1 to 20 carbon atoms may be an alkylsilyl group such as a methylsilyl group, a dimethylsilyl group, a trimethylsilyl group, a dimethylethylsilyl group, a diethylmethylsilyl group, and a dimethylpropylsilyl group; an alkoxysilyl group such as a methoxysilyl group, a dimethoxysilyl group, a trimethoxysilyl group, and a dimethoxyethoxysilyl group; an alkoxyalkylsilyl group such as a methoxydimethylsilyl group, a diethoxymethylsilyl group and a dimethoxypropylsilyl group; and the like.

An alkyl group having 1 to 20 carbon atoms may be a linear, branched, or cyclic alkyl group. Specifically, the alkyl group having 1 to 20 carbon atoms may be a linear alkyl group having 1 to 20 carbon atoms; a linear alkyl group having 1 to 10 carbon atoms; a linear alkyl group having 1 to 5 carbon atoms; a branched or cyclic alkyl group having 3 to 20 carbon atoms; a branched or cyclic alkyl group having 3 to 15 carbon atoms; or a branched or cyclic alkyl group having 3 to 10 carbon atoms. More specifically, the alkyl group having 1 to 20 carbon atoms may be a methyl group, an ethyl group, an n-propyl group, an iso-propyl group, an n-butyl group, an iso-butyl group, a tert-butyl group, an n-pentyl group, an iso-pentyl group, an neo-pentyl group, a cyclohexyl group, and the like.

An alkenyl group having 2 to 20 carbon atoms may be a linear, branched, or cyclic alkenyl group. Specifically, the alkenyl group having 2 to 20 carbon atoms may be a linear alkenyl group having 2 to 20 carbon atoms, a linear alkenyl group having 2 to 10 carbon atoms, a linear alkenyl group having 2 to 5 carbon atoms, a branched alkenyl group having 3 to 20 carbon atoms, a branched alkenyl group having 3 to 15 carbon atoms, a branched alkenyl group having 3 to 10 carbon atoms, a cyclic alkenyl group having 5 to 20 carbon atoms, or a cyclic alkenyl group having 5 to 10 carbon atoms. More specifically, the alkenyl group having 2 to 20 carbon atoms may be an ethenyl group, a propenyl group, a butenyl group, a pentenyl group, a cyclohexenyl group, or the like.

An aryl having 6 to 30 carbon atoms may refer to a monocyclic, bicyclic, or tricyclic aromatic hydrocarbon. Specifically, the aryl having 6 to 30 carbon atoms may be a phenyl group, a naphthyl group, an anthracenyl group, or the like.

An alkylaryl having 7 to 30 carbon atoms may refer to a substituent in which one or more hydrogens of aryl are substituted by alkyl. Specifically, the alkylaryl having 7 to 30 carbon atoms may be methylphenyl, ethylphenyl, n-propylphenyl, iso-propylphenyl, n-butylphenyl, iso-butylphenyl, tert-butylphenyl, cyclohexylphenyl, or the like.

An arylalkyl having 7 to 30 carbon atoms may refer to a substituent in which one or more hydrogens of alkyl are substituted by aryl. Specifically, the arylalkyl having 7 to 30 carbon atoms may be a benzyl group, a phenylpropyl, a phenylhexyl, or the like.

According to the preparation method of the embodiment, propylene and 1-butene are polymerized at a certain content ratio in the presence of the catalyst including a transition metal compound having the structure of Chemical Formula 1 to prepare a propylene-butene copolymer resin composition, thereby having a characteristic of securing excellent fiber processability while simultaneously decreasing a modulus in a manufacturing process of non-woven fabric to manufacture a softer non-woven fabric than the existing product.

The method of preparing a propylene-butene copolymer resin composition of the present invention may be performed by bring the catalyst including the transition metal compound represented by Chemical Formula 1 into contact with propylene and 1-butene.

Here, the propylene and 1-butene may be polymerized at a weight ratio of about 99:1 to about 90:10, about 99:1 to about 93:7, about 99:1 to about 96:4, or about 99:1 to about 94:6. Here, the weight ratio of 1-butene in the polymerization process should be 99:1 or more in terms of implementing a soft physical property, and 90:10 or less in terms of a limitation of production in a bulk polymerization process.

In addition, according to an exemplary embodiment of the present invention, the polymerization of propylene and 1-butene may be performed under hydrogen gas. Here, the hydrogen gas may be added at about 2000 ppm or less, about 10 to about 2000 ppm, about 50 to about 1500 ppm, about 150 to about 850 ppm, or about 200 to about 550 ppm, based on the total weight of propylene. By adjusting the usage of the hydrogen gas, a molecular weight distribution and flowability of the prepared propylene-butene copolymer resin composition may be adjusted to a desired range, while sufficient catalytic activity is shown, and accordingly, a propylene-butene copolymer having appropriate physical properties depending on the use may be prepared.

As the transition metal compound used as a catalyst in the method of preparing the propylene-butene copolymer resin composition, one or more of transition metal compounds represented by Chemical Formula 1 may be used. As described above, the transition metal compound in the present invention is characterized by containing an alkyl-substituted phenyl group together with a specific alkyl group in an indene group of Chemical Formula 1, and a specific alkoxy-substituted alkyl group in a bridge group.

More specifically, as the transition metal compound of Chemical Formula 1, a transition metal compound of Chemical Formula 1 wherein $R^3$ and $R^4$ are, independently of each other, any one of linear alkyls having 1 to 3 carbon atoms; a transition metal compound of Chemical Formula 1 wherein $R^5$ and $R^6$ are, independently of each other, any one of branched alkyls having 3 to 6 carbon atoms; or a transition metal compound of Chemical Formula 1 wherein $R^3$ and $R^4$ are, independently of each other, any one of linear alkyls having 1 to 3 carbon atoms, and $R^5$ and $R^6$ are, independently of each other, any one of branched alkyls having 3 to 6 carbon atoms, may be used. The transition metal compound having the structure may cause appropriate steric hindrance to guarantee the above-described effect more effectively.

The bridge group connecting an indenyl ligand in the transition metal compound of Chemical Formula 1 may have an influence on supporting stability of the transition metal compound. As an example, when $R^1$ is any one of alkyls having 1 to 20 carbon atoms or any one of branched alkyls having 3 to 6 carbon atoms, and n is an integer of 3 to 9, supporting efficiency for bulk polymerization may be increased. In addition, when $R^2$ is any one of hydrogen and alkyls having 1 to 20 carbon atoms or any one of linear alkyls having 1 to 3 carbon atoms, and A is C or Si, better supporting stability may be secured. In addition, the above-described bridge group may form a chemical bond with a carrier or a cocatalyst supported on a carrier to effectively prevent a fouling phenomenon in a reactor at the time of polymerization of olefin monomers.

As M in Chemical Formula 1, any one of Group 4 transition metals, or any one of Ti, Zr, and Hf, may be used to improve storage stability of a metal complex.

Preferably, the transition metal compound may be represented by the following Chemical Formula 2.

[Chemical Formula 2]

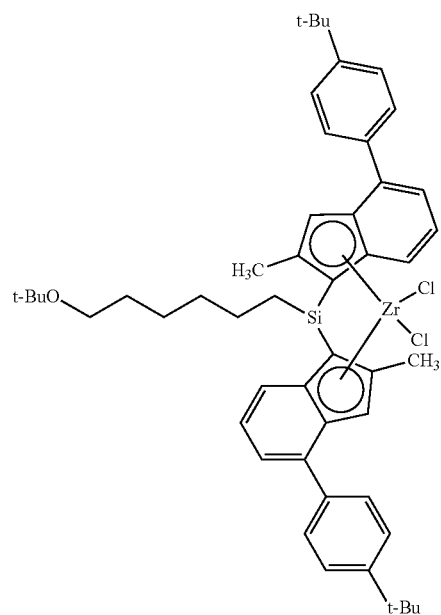

The transition metal compound represented by Chemical Formula 1 may be synthesized by applying known reactions, and for a more detailed synthesis method, Preparation Example 1 described below may be referred to.

Meanwhile, according to the preparation method of the embodiment, a catalyst including the transition metal compound having a structure of Chemical Formula 1 may further include various cocatalysts in terms of having high activity and improving process stability. The cocatalyst compound may include one or more of a compound represented by the following Chemical Formula 3 or Chemical Formula 4:

$$R^8\text{—}[Al(R^7)\text{—}O]_m\text{—}R^9 \qquad \text{[Chemical Formula 3]}$$

wherein $R^7$, $R^8$, and $R^9$ are, independently of each other, any one of hydrogen, a halogen, hydrocarbyl groups having 1 to 20 carbon atoms, and hydrocarbyl groups having 1 to 20 carbon atoms substituted by a halogen, and m is an integer of 2 or more, $$[L\text{-}H]^+[W(J)_4]^- \text{ or } [L]^+[W(J)_4]^- \qquad \text{[Chemical Formula 4]}$$

wherein

L is a neutral or cationic Lewis base,

W is a Group 13 element, and each J is, independently, any one of hydrocarbyl groups having 1 to 20 carbon atoms; hydrocarbyloxy groups having 1 to 20 carbon atoms; and substituents in which one or more hydrogen atoms of the substituent are substituted by one or more substituents of a halogen, hydrocarbyloxy groups having 1 to 20 carbon atoms, and hydrocarbyl(oxy)silyl groups having 1 to 20 carbon atoms.

For example, as the cocatalyst in the present invention, various cocatalysts represented by Chemical Formula 3 or 4 may be used. As an example, as the cocatalyst of Chemical Formula 3, methylaluminoxane, ethylaluminoxane, isobutylaluminoxane, tert-butylaluminoxane, a mixture thereof, or the like may be used. In addition, as the catalyst of Chemical Formula 4, trimethylammonium tetrakis(pentafluorophenyl)borate, triethylammonium tetrakis(pentafluorophenyl) borate, N,N-dimethylanilinium tetrakis(pentafluorophenyl)

borate, N,N-dimethylanilinium n-butyltris(pentafluorophenyl)borate, N,N-dimethylanilinium benzyltris(pentafluorophenyl)borate, N,N-dimethylanilinium tetrakis (4-(t-butyldimethylsilyl)-2,3,5,6-tetrafluorophenyl)borate, N,N-dimethylanilinium tetrakis (4-(triisopropylsilyl)-2,3,5,6-tetrafluorophenyl)borate, N,N-dimethylanilinium pentafluorophenoxytris(pentafluorophenyl)borate, N,N-dimethyl-2,4,6-trimethylanilinium tetrakis(pentafluorophenyl)borate, trimethylammonium tetrakis (2,3,4,6-tetrafluorophenyl)borate, N,N-dimethylanilinium tetrakis (2,3,4,6-tetrafluorophenyl)borate, hexadecyldimethylammonium tetrakis(pentafluorophenyl)borate, N-methyl-N-dodecylanilinium tetrakis(pentafluorophenyl)borate, methyldi(dodecyl)ammonium tetrakis(pentafluorophenyl)borate, or a mixture thereof may be used.

A use content of the cocatalyst may be appropriately adjusted depending on the physical properties or the effect of the catalyst and the resin composition that is desired.

In addition, according to the preparation method of the embodiment, the catalyst including the transition metal compound having the structure of Chemical Formula 1 may be used in a supported catalyst form in which the transition metal compound of Chemical Formula 1, and if necessary, the cocatalyst of Chemical Formula 3 or 4, supported on a carrier.

As the carrier, one containing a hydroxy group or a siloxane group on the surface may be used. Specifically, as the carrier, one containing a hydroxy group or a siloxane group which is dried at a high temperature to remove moisture on the surface, thereby having high reactivity, may be used. More specifically, as the carrier, silica, alumina, magnesia, a mixture thereof, or the like may be used. The carrier may be the one dried at a high temperature, which may generally include an oxide, or a carbonate, sulfate, or nitrate component, such as $Na_2O$, $K_2CO_3$, $BaSO_4$, and $Mg(NO_3)_2$.

The supported catalyst may be formed by supporting the cocatalyst of Chemical Formula 3, the transition metal compound of Chemical Formula 1, and the cocatalyst of Chemical Formula 4 sequentially on the carrier. The supported catalyst having a structure determined according to the supporting order may implement excellent process stability together with high activity in the preparation process of the propylene-butene copolymer resin composition.

In the preparation method according to the embodiment, various polymerization processes known for a polymerization reaction of an olefin monomer, such as a continuous solution polymerization process, a bulk polymerization process, a suspension polymerization process, a slurry polymerization process, and an emulsion polymerization process, may be adopted.

Specifically, the polymerization reaction may be performed at a temperature of about 40 to 110° C. or about 60 to 100° C. under pressure of about 1 to 100 kgf/cm$^2$.

In addition, in the polymerization reaction, the catalyst may be used in the state of being dissolved in or diluted with a solvent such as pentane, hexane, heptane, nonane, decane, toluene, benzene, dichloromethane, and chlorobenzene. Here, by treating the solvent with a small amount of alkylaluminum or the like, a small amount of water, air, or the like which may have an adverse effect on the catalyst may be removed in advance.

For a specific method of preparing the propylene-butene copolymer resin composition, the following examples may be referred to. However, the method of preparing the propylene-butene copolymer resin composition is not limited to the description of the present specification, the preparation method may further adopt a step commonly adopted in the art to which the present invention belongs, and the step(s) of the preparation method may be modified by a commonly modifiable step(s).

According to another embodiment of the present invention, spunbond non-woven fabric manufactured using the propylene-butene copolymer resin composition as described above is provided. Particularly, the spunbond non-woven fabric may be manufactured by a melt spun process which is characterized by melting the propylene-butene copolymer resin composition to be extruded into extrafine fiber web.

The spunbond non-woven fabric of the present invention may have a decreased modulus by optimizing a content of 1-butene, a correlation between a melt index and a residual stress ratio, and the like of the propylene-butene copolymer resin composition, thereby being capable of maintaining high strength, and imparting softer tactility than the conventional non-woven fabric.

Specifically, the spunbond non-woven fabric may have a Handle-O-Meter measurement value in a machine direction (MD) of the non-woven fabric of 7.5 g or less, about 3.0 g to about 7.5 g, about 7.0 g or less, about 4.0 g to about 7.0 g, about 6.0 g or less, or about 5.0 g to about 6.0 g, in terms of securing excellent flexibility. In addition, a Handle-O-Meter measurement value in a cross direction (CD) may be about 4.0 g or less, about 1.0 g to about 4.0 g, about 3.5 g or less, about 1.5 g to about 3.5 g, about 3.0 g or less, or about 1.8 g to about 3.0 g. When the Handle-O-Meter measurement value is maintained in the above-described range, excellent flexibility may be secured so that the spunbond non-woven fabric may have a decreased roughness characteristic and implement a soft physical property. The Handle-O-Meter is a value measured under the condition of a basis weight of the non-woven fabric of 13 to 17.5 g/m$^2$.

Meanwhile, the spunbond non-woven fabric may have tensile strength of about 1600 gf or more, about 1600 gf to about 3500 gf, about 1700 gf or more, about 1700 gf to about 2500 gf, about 1800 gf or more, or about 1800 gf to about 2000 gf, as measured in a machine direction (MD) of the non-woven fabric according to the method of ASTM D-5035 which is a standard of the American Society for Testing and Materials (ASTM), in terms of maintaining high strength. In addition, the tensile strength may be 730 gf or more, about 730 gf to about 2000 gf, about 750 gf or more, about 750 gf to about 1500 gf, about 770 gf or more, or about 770 gf to about 1000 gf, as measured in a cross direction (CD) of the non-woven fabric according to the method of ASTM D-5035 which is a standard of the American Society for Testing and Materials (ASTM). When the tensile strength of the spunbond non-woven fabric is maintained in the above-described range, a soft physical property may be implemented, and high strength may be maintained at the time of processing a final product. The tensile strength is a value measured under the condition of a basis weight of the non-woven fabric of 13 to 17.5 g/m$^2$.

When the Handle-O-Meter and the tensile strength are measured, the condition of the basis weight of the non-woven fabric of 14.2 to 15.9 g/m$^2$ may be applied.

Particularly, the spunbond non-woven fabric according to the present invention is characterized by simultaneously satisfying the Handle-O-Meter measurement value range and the tensile strength range as described above, thereby maintaining high strength and implementing a softer property than the existing product.

Hereinafter, preferred examples will be presented for helping understanding of the present invention. However, the following examples are only for illustrating the present invention, and the description of the present invention is not limited to the examples.

Preparation of Catalyst

Preparation Example 1: Preparation of Transition Metal Compound and Supported Catalyst

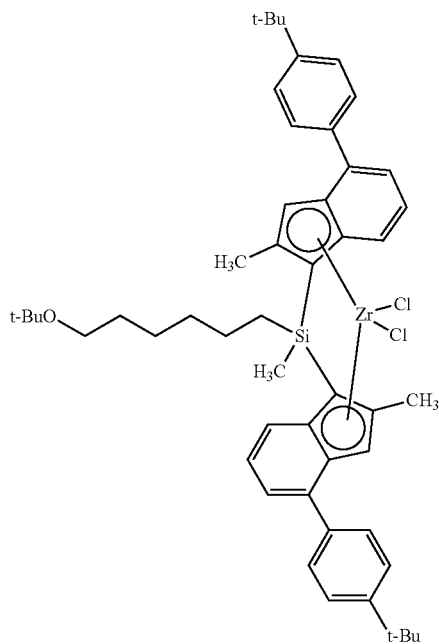

Step 1: Preparation of bis(2-methyl-4-(4-tert-butylphenyl)indenyl)(64-butoxyhexyl) (methyl) silane 2-methyl-4-tert-butylphenylindene (20.0 g, 76 mmol) was dissolved in a solution of toluene/THF=10/1 (230 mL), and then an n-butyllithium solution (2.5 M, hexane solvent, 22 g) was slowly added dropwise thereto at about 0° C. Then, the obtained mixed solution was stirred at room temperature for a day. Thereafter, to the mixed solution, (6-t-butoxyhexyl)dichloromethylsilane (1.27 g) was slowly added dropwise at about −78° C., stirred for about 10 minutes, and then stirred at room temperature for a day. Thereafter, water was added to separate an organic layer, and the solvent was distilled under reduced pressure to obtain bis(2-methyl-4-(4-tert-butylphenyl)indenyl)(6-t-butoxyhexyl)(methyl)silane.

$^1$H NMR (500 MHz, CDCl$_3$, 7.26 ppm): −0.20-0.03 (3H, m), 1.26 (9H, s), 0.50-1.20 (4H, m), 1.20-1.31 (11H, m), 1.40-1.62 (20H, m), 2.19-2.23 (6H, m), 3.30-3.34 (2H, m), 3.73-3.83 (2H, m), 6.89-6.91 (2H, m), 7.19-7.61 (14H, m).

Step 2: Preparation of [(6-t-butoxyhexylmethylsilanediyl)-bis(2-methyl-4-(4-tert-butylphenyl)indenyl)]zirconium Dichloride (6-t-butoxyhexyl)(methyl)-bis(2-methyl-4-(4-tert-butylphenyl)indenyl)silane prepared in step 1 was dissolved in a solution of toluene/THF=5/1 (95 mL), and a n-butyl-lithium solution (2.5 M, hexane solvent, 22 g) was slowly added dropwise at about −78° C., and then stirred at room temperature for a day. Bis(N,N'-diphenyl-1,3-propanediamino)dichlorozirconium bis(tetrahydrofuran) [Zr (C$_5$H$_6$NCH$_2$CH$_2$CH$_2$NC$_5$H$_6$)$_2$Cl$_2$(C$_4$H$_8$O)$_2$] was dissolved in toluene (229 mL), slowly added dropwise to the reaction solution at about −78° C., and stirred at room temperature for a day. The reaction solution was cooled to about −78° C., a HCl ether solution (1 M, 183 mL) was slowly added dropwise, and then stirred at 0° C. for about 1 hour. Thereafter, the solution was filtered, dried in vacuo, and stirred after adding hexane thereto, thereby precipitating a crystal. The precipitated crystal was filtered and dried under reduced pressure to obtain [(6-t-butoxyhexylmethylsilanediyl)-bis(2-methyl-4-(4-tert-butylphenyl)indenyl)]zirconium dichloride (20.5 g, a yield of 61%).

$^1$H NMR (500 MHz, CDCl$_3$, 7.26 ppm): 1.20 (9H, s), 1.27 (3H, s), 1.34 (18H, s), 1.20-1.90 (10H, m), 2.25 (3H, s), 2.26 (3H, s), 3.38 (2H, t), 7.00 (2H, s), 7.09-7.13 (2H, m), 7.38 (2H, d), 7.45 (4H, d), 7.58 (4H, d), 7.59 (2H, d), 7.65 (2H, d)

Step 3: Preparation of Supported Catalyst

To a Schlenk flask including 3 g of silica, 52 mmol of methylaluminoxane (MAO) was added and reacted at about 90° C. for about 24 hours. After completing the reaction, when the reaction product settled, the precipitate remaining after removing a supernatant solution was washed twice with toluene. Then, 240 μmol of [(6-t-butoxyhexylmethylsilanediyl)-bis(2-methyl-4-(4-tert-butylphenyl)indenyl)]zirconium dichloride prepared above was dissolved in toluene and injected into the flask, and reacted at about 70° C. for about 5 hours. Thereafter, 48 μmol of N,N-dimethylanilinium tetrakis(pentafluorophenyl)borate was added to the flask, and reacted at about 70° C. for about 5 hours. After completing the reaction, when the reaction product settled, the precipitate remaining after removing a supernatant solution was washed with toluene, washed again with hexane, and dried in vacuo to obtain a silica-supported metallocene catalyst in a solid particle form.

Comparative Preparation Example 1: Preparation of Transition Metal Compound and Supported Catalyst

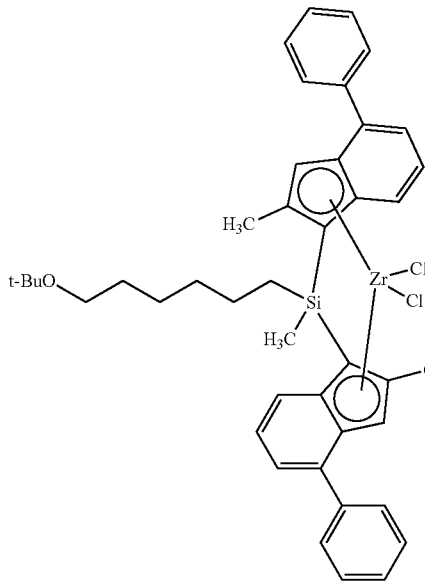

Step 1: Preparation of (6-t-butoxyhexyl)(methyl)-bis(2-methyl-4-phenylindenyl)silane First, to 100 mL of a trichloromethylsilane solution (about 0.21 mol, hexane), 100 mL of a t-butoxyhexyl magnesium chloride solution (about 0.14 mol, ether) was slowly added dropwise at about −100° C. for about 3 hours, and stirred at room temperature for about 3 hours. After a transparent organic layer was separated from the mixed solution, the separated transparent organic layer was dried in vacuo to remove an excess amount of trichloromethylsilane, thereby obtaining (6-t-butoxyhexyl)dichloromethylsilane in a transparent liquid phase.

To 77 mL of a solution of 2-methyl-4-phenylindene toluene/THF=10/1 (34.9 mmol), 15.4 mL of an n-butyllithium solution (2.5 M, hexane solvent) was slowly added dropwise at about 0° C., and stirred at about 80° C. for about 1 hour, and then stirred at room temperature for a day. Thereafter, at about −78° C., 5 g of (6-tert-butoxyhexyl) dichloromethylsilane which was prepared prior to the mixed solution was slowly added dropwise, and stirred for about 10 minutes, and then stirred at about 80° C. for about 1 hour. Then, water was added to separate an organic layer, silica column purification was performed, and vacuum drying was performed, thereby obtaining a sticky yellow oil in a yield of 78% (racemic:meso=1:1).

$^1$H NMR (500 MHz, CDCl$_3$, 7.24 ppm): 0.10 (3H, s), 0.98 (2H, t), 1.25 (9H, s), 1.36-1.50 (8H, m), 1.62 (8H, m), 2.26 (6H, s), 3.34 (2H, t), 3.81 (2H, s), 6.87 (2H, s), 7.25 (2H, t), 7.35 (2H, t), 7.45 (4H, d), 7.53 (4H, t), 7.61 (4H, d)

Step 2: Preparation of [(6-t-butoxyhexylmethylsilane-diyl)-bis(2-methyl-4-phenylindenyl)]zirconium Dichloride To 50 mL of a solution of (6-tert-butoxyhexyl)(methyl) bis(2-methyl-4-phenyl)indenylsilane ether/hexane=1/1 (3.37 mmol) which was previously prepared, 3.0 mL of an n-butyllithium solution (2.5 M in hexane) was slowly added dropwise at about −78° C., and then stirred at room temperature for 2 hours, and dried in vacuo. The resulting salt was washed with hexane, and then filtered and dried in vacuo, thereby obtaining a yellow solid. A ligand salt synthesized in a glove box and bis(N,N'-diphenyl-1,3-propanediamido)dichlorozirconium bis(tetrahydrofuran) [Zr (C$_5$H$_6$NCH$_2$CH$_2$NC$_5$H$_6$)Cl$_2$(C$_4$H$_8$O)$_2$] were weighed in a Schlenk flask, ether was slowly added dropwise at about −78° C., and the reactants were stirred at room temperature for a day. Thereafter, a red reaction solution was filtered and separated, and 4 equivalents of a HCl ether solution (1 M) was slowly added dropwise at about −78° C., and then stirred at room temperature for about 3 hours. Thereafter, the solution was filtered and dried in vacuo to obtain an ansametallocene compound of an orange solid component in a yield of 85% (racemic:meso=10:1).

$^1$H NMR (500 MHz, C$_6$D$_6$, 7.24 ppm): 1.19 (9H, s), 1.32 (3H, s), 1.48-1.86 (10H, m), 2.25 (6H, s), 3.37 (2H, t), 6.95 (2H, s), 7.13 (2H, t), 7.36 (2H, d), 7.43 (6H, t), 7.62 (4H, d), 7.67 (2H, d)

Step 3: Preparation of Supported Catalyst

A silica supported metallocene catalyst was prepared in the same manner as in step 3 of Preparation Example 1, using the metallocene compound synthesized above ([(6-t-butoxyhexylmethylsilane-diyl)-bis(2-methyl-4-phenylindenyl)]zirconium dichloride).

Preparation of Resin Composition

Example 1: Random Polymerization of Propylene

As shown in the following Table 1, a content of propylene, a content of 1-butene, a polymerization process condition, and the like were adjusted, thereby obtaining a propylene-butene copolymer resin composition (C4-random copolymer).

A 2 L stainless steel reactor was dried in vacuo at about 65° C. and cooled, and 1.5 mmol of triethylaluminum, 300 ppm of hydrogen, 10 g of 1-butene, and 770 g of propylene were added thereto sequentially at room temperature. Thereafter, stirring was performed for about 10 minutes, and 0.048 g of the silica supported metallocene catalyst according to Preparation Example 1 was dissolved in about 20 mL of TMA-prescribed hexane, and added to the reactor under nitrogen pressure. Thereafter, the reactor temperature was slowly raised to about 70° C., and polymerization was performed for about 1 hour. After completing the reaction, unreacted propylene and 1-butene were vented and removed by drying.

Examples 2 and 3: Random Polymerization of Propylene

Propylene-butene copolymer resin compositions (C4-random copolymers) were obtained in the same manner as in Example 1, except that 400 ppm and 550 ppm of hydrogen was added, respectively, as shown in the following Table 1.

Comparative Examples 1 to 3: Random Polymerization of Propylene

Propylene-butene copolymer resin compositions (C4-random copolymers) of Comparative Examples 1 to 3 were obtained in the same manner as in Examples 1 to 3, except that the catalyst of Comparative Preparation Example 1 was used instead of the catalyst of Preparation Example 1, and as the catalyst was changed, hydrogen was added at 350 ppm, 450 ppm, and 550 ppm, respectively, for preparing resins having an MI level similar to Examples 1 to 3, as shown in the following Table 1.

Comparative Examples 4 and 5: Random Polymerization of Propylene

Propylene-butene copolymer resin compositions (C4-random copolymers) were obtained in the same manner as in Example 1, except that the content of 1-butene was 2 g and 20 g, respectively, as shown in the following Table 1.

However, the propylene-butene copolymer resin composition (C4-random copolymer) which was polymerized with an increased amount of 1-butene according to Comparative Example 5 showed a waxy nature, not a powder form, and it was impossible to manufacture non-woven fabric as a subsequent process with the composition.

Comparative Example 6: Homopolymerization of Propylene

A 2 L stainless steel reactor was dried in vacuo at about 65° C. and cooled, and 1.5 mmol of triethylaluminum, 500 ppm of hydrogen, and 770 g of propylene were added sequentially at room temperature. Thereafter, stirring was performed for about 10 minutes, and 0.048 g of the silica-supported metallocene catalyst according to Preparation Example 1 was dissolved in 20 mL of TMA-prescribed hexane and added to the reactor under nitrogen pressure. Thereafter, the reactor temperature was slowly raised to about 70° C., and then polymerization was performed for about 1 hour. After completing the reaction, unreacted propylene was vented.

Homopolymerization of propylene was performed in the preparation method to obtain a propylene homopolymer resin composition (homo mPP, propylene homopolymer).

Comparative Example 7: Random Polymerization of Propylene

A 2 L stainless steel reactor was dried in vacuo at 65° C. and cooled, and 1.5 mmol of triethylaluminum and 770 g of propylene were added sequentially at room temperature. Thereafter, stirring was performed for 10 minutes, and 0.048 g of the metallocene catalyst prepared in Preparation Example 1 was dissolved in 20 mL of TMA-prescribed hexane and added to the reactor under nitrogen pressure. Thereafter, a total of 5 g of ethylene was added while the reactor temperature was slowly raised to 70° C., and polymerization was performed for 1 hour. After completing the reaction, unreacted propylene and ethylene were vented.

Details of the content of propylene, the content of 1-butene, polymerization conditions, and the like in the process of preparing the resin composition according to Examples 1 to 3 and Comparative Examples 1 to 7 are shown in the following Table 1.

Evaluation of Physical Properties for Resin Composition and Non-Woven Fabric Manufactured Therefrom Experimental Example 1: Evaluation of Physical Properties of Resin Composition For the resin compositions according to Examples 1 to 3 and Comparative Examples 1 to 8, evaluation of physical properties was performed by the following method, and the results are shown in the following Table 2.

(1) Melt Index (MI)

Measured at 230° C. under a load of 2.16 kg, according to ASTM D 1238, which is a standard of the American Society for Testing and Materials, and represented as a weight (g) of a polymer which was produced by melting for 10 minutes.

(2) Content of 1-butene

According to ASTM D 5576, which is a standard of the American Society for Testing and Materials, a film or a specimen in the form of a film of the resin compositions according to Examples 1 to 3 and Comparative Examples 1 to 7 was fixed to a magnetic holder of FT-IR equipment, and then a height of a peak at 4800-3500 cm$^{-1}$ which reflects a thickness of the specimen and an area of a peak at 790-660 cm$^{-1}$ representing a 1-butene component in an IR absorption spectrum were measured and calculated. According to the method of ASTM D 5576, which is a standard of the

TABLE 1

| | Example 1 | Example 2 | Example 3 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Polymer type | C4-random copolymer | C4-random copolymer | C4-random copolymer | C4-random copolymer | C4-random copolymer | C4-random copolymer | C4-random copolymer | C4-random copolymer | Homo mPP | C2-random copolymer |
| Catalyst | Preparation Example 1 | Preparation Example 1 | Preparation Example 1 | Comparative Preparation Example 1 | Comparative Preparation Example 1 | Comparative Preparation Example 1 | Preparation Example 1 | Preparation Example 1 | Preparation Example 1 | Preparation Example 1 |
| Polymerization temperature (° C.) | 70 | 70 | 70 | 70 | 70 | 70 | 70 | 70 | 70 | 70 |
| Hydrogen (ppm) | 300 | 400 | 500 | 350 | 450 | 550 | 400 | 400 | 500 | 200 |
| Propylene [C3] input (g) | 770 | 770 | 770 | 770 | 770 | 770 | 770 | 770 | 770 | 770 |
| Butene [C4] or ethylene [C2] input (g) | 10 | 10 | 10 | 10 | 10 | 10 | 2 | 50 | — | 5 |

Comparative Example 8: Homopolymerization of Propylene

As a propylene homopolymer resin composition (Z/N homo PP, propylene homopolymer) prepared by performing homopolymerization of propylene with a Ziegler-Natta catalyst, a currently commercially available product (manufactured by LG Chem, product name: H7700) was prepared.

American Society for Testing and Materials, the measured value was put into the calibration formula obtained by plotting the value which was obtained by dividing an area of a peak at 790-660 cm$^{-1}$ by a height of a peak at 4800-3500 cm$^{-1}$ of a standard sample.

(3) Melting Point (Tm)

The temperature was raised to 200° C., maintained at that temperature for about 5 minutes, lowered to 30° C., and then raised again, and a peak of a differential scanning calorimeter (DSC, manufactured by TA Instruments) curve was determined as a melting point. Here, a speed of temperature rise and drop was 10° C./min, and as the melting point, a result measured in the section where a second temperature rose was used.

(4) Measurement of Residual Stress Ratio

For the resin composition according to Examples 1 to 3 and Comparative Examples 1 to 8, each sample was taken and strain at 200% was applied thereto at 235° C., and change in residual stress was measured for 10 minutes.

For the measurement of the residual stress, a Discovery Hybrid Rheometer (DHR) from TA Instruments was used, and the sample was sufficiently loaded between upper and lower plates having a diameter of 25 mm, and dissolved at 235° C., and the gap was fixed to 1 mm.

Based on the data of measured residual stress, a ratio of residual stress (RS %) was calculated according to the following Calculation Formula 3, and is shown in the following Table 2:

$$\text{Residual stress ratio } (Y) = (RS_1/RS_0)*100 \quad \text{[Calculation Formula 3]}$$

wherein $RS_0$ is residual stress at 0.02 seconds ($t_0$) after applying strain at 200% to a synthetic resin sample at 235° C., and $RS_1$ is residual stress at 1.00 second ($t_1$) after applying strain at 200% to a synthetic resin sample at 235° C.

(5) Evaluation of Correlation Between Melt Index (MI) and Residual Stress Ratio

Based on the values of the melt index (X) and the residual stress ratio (Y) measured by the method as described above, a specific numerical range according to the following Calculation Formula 4 is shown in the following Table 2:

$$0.25*EXP(-0.115*X) < Y < 0.50*EXP(-0.115*X) \quad \text{[Calculation Formula 4]}$$

wherein

X is a melt index (MI) measured at 230° C. under a load of 2.16 kg according to ASTM D 1238 which is a standard of the American Society for Testing and Materials, and Y is a residual stress ratio obtained according to the above Calculation Formula 3.

(6) Measurement of Molecular Weight (Mw, Mn) and Molecular Weight Distribution (MWD)

For the resin compositions according to Examples 1 to 3 and Comparative Examples 1 to 8, gel permeation chromatography (GPC) was used to measure a weight average molecular weight (Mw) and a number average molecular weight (Mn), and then based on which, a molecular weight distribution (MWD, i.e., Mw/Mn) was calculated.

Specifically, as a gel permeation chromatography (GPC) apparatus, a Waters PL-GPC220 instrument was used, using a PLgel MIX-B column having a length of 300 mm from Polymer Laboratories. Here, a measurement temperature was 160° C., 1,2,4-trichlorobenzene was used as a solvent, and a flow rate was measured at a rate of 1 mL/min. Samples of the resin compositions according to Examples 1 to 3 and Comparative Examples 1 to 8 were prepared at a concentration of 10 mg/10 mL, and supplied in an amount of 200 μL, respectively.

A calibration curve formed using a polystyrene standard specimen was used to derive the values of Mw and Mn. As the polystyrene standard specimen, nine specimens having molecular weights of 2000 g/mol, 10,000 g/mol, 30,000 g/mol, 70,000 g/mol, 200,000 g/mol, 700,000 g/mol, 2,000,000 g/mol, 4,000,000 g/mol, and 10,000,000 g/mol, respectively, were used.

Experimental Example 2: Evaluation of Physical Properties of Melt Spunbond Non-Woven Fabric A melt spun process was performed, using the resin composition according to Examples 1 to 3 and Comparative Examples 1 to 8 as a raw material, thereby manufacturing spunbond non-woven fabric.

Specifically, a 25 mm twin-screw extruder was used to manufacture masterbatches of the resin compositions according to Examples 1 to 3 and Comparative Examples 1 to 8 and an Exolit® OP 950 additive (2.5 wt %), which were then pelletized. Subsequently, the masterbatch pellets were extruded into extrafine fiber webs by a process similar to that described in the document [Report No. 4364 of the Naval Research Laboratories, published May 25, 1954 entitled "Manufacture of Superfine Organic Fibers" by Wente, Van. A. Boone, C. D. and Fluharty, E. L.], except that a 31 mm Brabender conical twin screw extruder was used to supply the melted masterbatch compositions to a melt pump (65 rpm), and then to a melt spun die having outlets (10 outlets/cm) with a diameter of 381 μm and a width of 25 cm.

A melting temperature was 235° C., a screw speed was 120 rpm, the die was maintained at 235° C., first air temperature and pressure were 300° C. and 60 kPa (8.7 psi), respectively, a polymer treatment speed was 5.44 kg/h, and a collector/die distance was 15.2 cm.

Then, whether a yarn breaking was produced in the melt spun process (processability) is shown in the following Table 2.

In addition, evaluation for tactility (softness) of non-woven fabric was performed with a sensory test method, and the measurement results are shown in Table 2. Specifically, this skin contact sensory evaluation was performed by an evaluation team composed of 5 people, and indicators representing soft tactility were indicated as 1 to 10, respectively, in which the higher the number is, the softer the tactility is. According to the average values of the sensory evaluation, when the average value was more than or equal to 8, "excellent" was indicated, when the average value was more than or equal to 6 and less than 8, "good" was indicated, when the average value was more than or equal to 4 and less than 6, "normal" was indicated, and when the average value was less than 4, "poor (X)" was indicated.

Meanwhile, for evaluating the flexibility and mechanical physical properties of non-woven fabric, a Handle-O-Meter instrument from Thwing-Albert Instrument was used to measure flexibility (Total Hand, MD/CD, g) of non-woven fabric in the machine direction (MD) and in the cross direction (CD). Here, the used Handle-O-Meter value had an error of ±25% which was known from the manufacturer. In addition, according to the method of the standard D-5035 of the American Society for Testing and Materials, that is, the cut-strip method of ASTM D-5035, a tensile and compression strength tester from Instron (Universal Testing Systems, UTM) was used to measure tensile strength (MD/CD, gf) in the machine direction (MD) and in the cross direction (CD). Here, the Handle-O-meter value and the tensile strength of the non-woven fabric were measured under the condition of the basis weight (g/m$^2$) as shown in the following Table 2.

TABLE 2

| | Example 1 | Example 2 | Example 3 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|
| Polymer type | C4-random copolymer | C4-random copolymer | C4-random copolymer | C4-random copolymer | C4-random copolymer | C4-random copolymer | C4-random copolymer | C4-random copolymer | Homo mPP | C2-random copolymer | Z/N homo PP |
| C4 content (%) | 1.60 | 1.63 | 1.59 | 1.51 | 1.82 | 1.66 | 0.28 | 8.21 | — | 1.05 | — |
| MI (g/10 min, X) | 15 | 25 | 32 | 14 | 25 | 31 | 24 | 27 | 25 | 30 | 32 |
| Tm (°C.) | 144 | 143 | 144 | 142 | 140 | 141 | 151 | 113 | 152 | 144 | 160 |
| MWD | 2.3 | 2.2 | 2.2 | 2.9 | 2.8 | 2.8 | 2.4 | 2.2 | 2.4 | 2.2 | 2.9 |
| Residual stress ratio (Y) | 0.071 | 0.022 | 0.009 | 0.211 | 0.149 | 0.082 | 0.049 | — | 0.05 | 0.006 | 0.15 |
| Correlation formula between X and Y[1] | 0.045 < Y < 0.089 | 0.014 < Y < 0.028 | 0.006 < Y < 0.013 | 0.050 < Y < 0.100 | 0.014 < Y < 0.028 | 0.007 < Y < 0.014 | 0.016 < Y < 0.032 | 0.011 < Y < 0.022 | 0.014 < Y < 0.028 | 0.006 < Y < 0.013 | 0.006 < Y < 0.013 |
| Basis weight of non-woven fabric (g/m$^2$) | 14.8 | 15.9 | 14.2 | 14.6 | 13.9 | 16.1 | 15.9 | — | 13.5 | 15.2 | 17.4 |
| Processability (single yarn) | Good | Good | Good | Poor | Poor | Good | Good | — | Good | Good | Good |
| Tactility | excellent | excellent | excellent | good | good | good | normal | — | normal | excellent | normal |
| Total Hand (MD, g) | 5.7 | 5.8 | 5.6 | 5.7 | 5.5 | 5.9 | 10.5 | — | 11.0 | 5.6 | 11.5 |
| Total Hand (CD, g) | 2.8 | 2.8 | 2.5 | 2.8 | 2.9 | 3.0 | 6.5 | — | 7.2 | 2.5 | 7.5 |
| Strength (MD, gf) | 1910 | 1820 | 1850 | 1550 | 1450 | 1380 | 2500 | — | 2950 | 800 | 2750 |
| Strength (CD, gf) | 790 | 780 | 805 | 705 | 680 | 650 | 1300 | — | 1650 | 450 | 1450 |

[1] A correlation between melt index (X) and residual stress ratio (Y) according to Calculation Formula 4

Referring to Table 2, the propylene-butene copolymer resin compositions of Examples 1 to 3 having a content of 1-butene and a correlation between a melt index and a residual stress ratio which were optimized according to an embodiment of the present invention did not cause a yarn breaking in the melt spun process using the compositions as a raw material, thereby allowing continuous execution of the process.

However, the propylene-butene copolymer resin compositions of Comparative Examples 1 and 2 having a content of 1-butene and a correlation between a melt index and a residual stress ratio which were out of optimum ranges occurred a yarn breaking in the melt spun process using the compositions as a raw material, whereby continuous execution of the process was impossible. In addition, the propylene-butene copolymer resin composition of Comparative Example 3 represented a characteristic of MI of 30 or more and had good processability, but was confirmed to have a problem in non-woven fabric strength; and the propylene homopolymer resin composition of Comparative Example 4 had good processability, but the non-woven fabric manufactured therefrom represented a rough characteristic and was confirmed to have a problem in implementing a soft physical property.

In addition, the propylene homopolymer resin composition of Comparative Example 5 had a significantly lowered melting point of 113° C. due to excessive input of the content of 1-butene, and the resin form represented a waxy nature, not a powder form, whereby the process of manufacturing non-woven fabric was not able to be performed.

Meanwhile, the propylene homopolymer resin composition of Comparative Example 6 represented a stiff characteristic, and was confirmed to have a problem in being applied to soft non-woven fabric; and the propylene-ethylene polymer of Comparative Example 7 had a drawback of being easily torn due to significantly lowered non-woven fabric strength, from which it was found that the polymer is inappropriate for non-woven fabric used for hygiene supplies such as disposable diapers. In addition, the propylene homopolymer resin composition which was polymerized using the Ziegler-Natta catalyst of Comparative Example 8 had good processability, but the non-woven fabric manufactured therefrom represented a rough characteristic, and was confirmed to have a problem in implementing a soft physical property.

Particularly, in the present invention, the content of 1-butene was optimized to 0.5 to 5.0 wt %, and the correlation between a melt index and a residual stress ratio was optimized, thereby having an excellent effect of increasing a softness property based on the strength similar to the strength of the conventional non-woven fabric using homopolypropylene. Further, in the non-woven fabric processing industry, technology to increase the softness property by a method of changing a processing condition is known, however, the present invention may obtain a merit of manufacturing high-strength soft non-woven fabric with only replacement of the resin without changing the processing conditions of the existing process using homopolypropylene.

The invention claimed is:

1. A propylene-butene copolymer resin composition, wherein a content of 1-butene is 0.5 to 5.0 wt %, and a melt index (MI, X) and a residual stress ratio (Y) satisfy the following Calculation Formula 1:

$$0.25*EXP(-0.115*X) < Y < 0.50*EXP(-0.115*X) \quad \text{[Calculation Formula 1]}$$

wherein

X is a melt index (MI) measured at 230° C. under a load of 2.16 kg according to ASTM D 1238, and Y is a residual stress ratio obtained according to the following Calculation Formula 2:

$$\text{Residual stress ratio } (Y) = (RS_1/RS_0)*100 \quad \text{[Calculation Formula 2]}$$

wherein $RS_0$ is residual stress at any one point ($t_0$) within 0.05 seconds after applying strain at 200% to the resin composition at 235° C., and $RS_1$ is residual stress at any one point ($t_1$) between 0.05 seconds and 1.50 seconds after applying strain at 200% to the resin composition at 235° C.

2. The propylene-butene copolymer resin composition of claim 1, wherein the melt index is 12 g/10 min to 37 g/10 min.

3. The propylene-butene copolymer resin composition of claim 1, wherein the residual stress ratio is 0.005% to 0.085%.

4. The propylene-butene copolymer resin composition of claim 1, wherein the composition has a molecular weight distribution of 2.6 or less.

5. The propylene-butene copolymer resin composition of claim 1, wherein the composition has a melting point of 148° C. or less.

6. A method of preparing the propylene-butene copolymer resin composition of claim 1, comprising polymerizing propylene and 1-butene at a weight ratio of 99:1 to 90:10 in the presence of a catalyst including a transition metal compound represented by the following Chemical Formula 1, thereby preparing a propylene-butene copolymer:

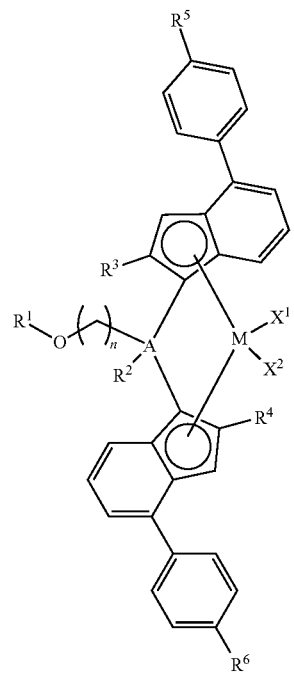

[Chemical Formula 1]

wherein

M is any one of a group consisting of Group 3 transition metals, Group 4 transition metals, Group 5 transition metals, lanthanide series transition metals, and actinide series transition metals;

$X^1$ and $X^2$ are identical to or different from each other, and are, independently of each other, any one of halogens;

A is any one of Group 14 elements;

n is an integer of 1 to 20;

$R^1$ is any one of alkyls having 1 to 20 carbon atoms, alkenyls having 2 to 20 carbon atoms, alkylaryls having 7 to 30 carbon atoms, arylalkyls having 7 to 30 carbon atoms, and aryls having 6 to 30 carbon atoms;

$R^2$ is any one of hydrogen, alkyls having 1 to 20 carbon atoms, alkenyls having 2 to 20 carbon atoms, alkylaryls having 7 to 30 carbon atoms, arylalkyls having 7 to 30 carbon atoms, and aryls having 6 to 30 carbon atoms; and $R^3$ to $R^6$ are, independently of each other, any one of alkyls having 1 to 20 carbon atoms.

7. The method of claim 6, wherein $R^3$ and $R^4$ of the Chemical Formula 1 are, independently of each other, any one of linear alkyls having 1 to 3 carbon atoms.

8. The method of claim 6, wherein $R^5$ and $R^6$ of the Chemical Formula 1 are, independently of each other, any one of branched alkyls having 3 to 6 carbon atoms.

9. The method of claim 6, wherein $R^1$ of the Chemical Formula 1 is any one of branched alkyls having 3 to 6 carbon atoms, and n is an integer of 3 to 9.

10. The method of claim 6, wherein $R^2$ of the Chemical Formula 1 is any one of linear alkyls having 1 to 3 carbon atoms.

11. The method of preparing the propylene-butene copolymer resin composition of claim 6, wherein M of the Chemical Formula 1 is any one of Group 4 transition metals is used.

12. The method of preparing the propylene-butene copolymer resin composition of claim 6, wherein, the transition metal compound is represented by the following Chemical Formula 2:

[Chemical Formula 2]

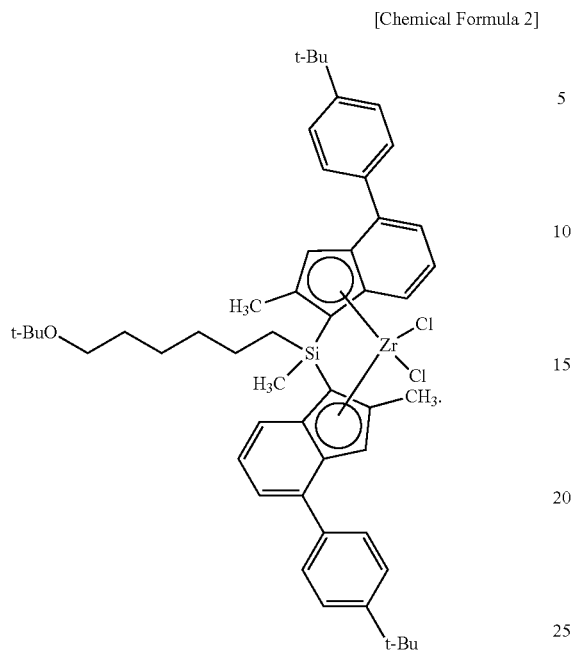

[Chemical Formula 1]

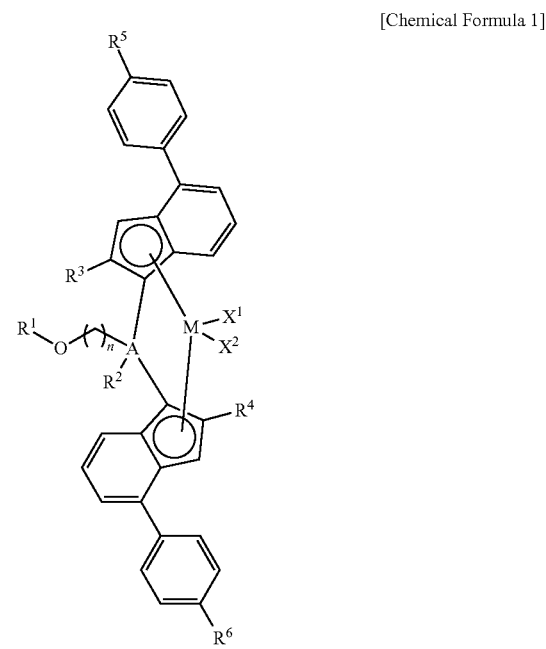

13. A spunbond non-woven fabric prepared from the propylene-butene copolymer resin composition of claim 1.

14. The spunbond non-woven fabric of claim 13, wherein, under a condition of a basis weight of the non-woven fabric being 13 to 17.5 g/m², a Handle-O-Meter measurement value of the non-woven fabric in a machine direction (MD) is 7.5 g or less, and a Handle-O-Meter measurement value of the non-woven fabric in a cross direction (CD) is 4.0 g or less.

15. The spunbond non-woven fabric of claim 13, wherein, under a condition of a basis weight of the non-woven fabric being 13 to 17.5 g/m², tensile strength of the non-woven fabric measured in a machine direction (MD) according to a method of ASTM D-5035 is 1600 gf or more, and tensile strength of the non-woven fabric measured in a cross direction (CD) according to the method of ASTM D-5035 is 730 gf or more.

16. The propylene-butene copolymer resin composition of claim 4, wherein the molecular weight distribution is from 2.0 to 2.6.

17. The propylene-butene copolymer resin composition of claim 5, wherein the melting point is from 130° C. to 148° C.

18. The spunbond non-woven fabric of claim 14, wherein the Handle-O-Meter measurement value in the machine direction (MD) is from 3.0 g to 7.5 g, and the Handle-O-Meter measurement value in the cross direction (CD) is from 1.0 g to 4.0 g.

19. The spunbond non-woven fabric of claim 15, wherein the tensile strength in the machine direction (MD) is from 1600 gf to 3500 gf and the tensile strength of the cross direction (CD) is from 730 gf to 2000 gf.

20. A propylene-butene copolymer resin composition prepared by polymerizing propylene and 1-butene at a weight ratio of 99:1 to 90:10 in the presence of a catalyst including a transition metal compound represented by the following Chemical Formula 1, wherein
M is any one of a group consisting of Group 3 transition metals, Group 4 transition metals, Group 5 transition metals, lanthanide series transition metals, and actinide series transition metals;
$X^1$ and $X^2$ are identical to or different from each other, and are, independently of each other, any one of halogens;
A is any one of Group 14 elements;
n is an integer of 1 to 20;
$R^1$ is any one of alkyls having 1 to 20 carbon atoms, alkenyls having 2 to 20 carbon atoms, alkylaryls having 7 to 30 carbon atoms, arylalkyls having 7 to 30 carbon atoms, and aryls having 6 to 30 carbon atoms;
$R^2$ is any one of hydrogen, alkyls having 1 to 20 carbon atoms, alkenyls having 2 to 20 carbon atoms, alkylaryls having 7 to 30 carbon atoms, arylalkyls having 7 to 30 carbon atoms, and aryls having 6 to 30 carbon atoms; and
$R^3$ to $R^6$ are, independently of each other, any one of alkyls having 1 to 20 carbon atoms;
wherein the propylene-butene copolymer resin composition has a content of 1-butene is 0.5 to 5.0 wt %, and a melt index (MI, X) and a residual stress ratio (Y) satisfy the following Calculation Formula 1:

$$0.25*EXP(-0.115*X) < Y < 0.50*EXP(-0.115*X) \quad \text{[Calculation Formula 1]}$$

wherein
X is a melt index (MI) measured at 230° C. under a load of 2.16 kg according to ASTM D 1238, and
Y is a residual stress ratio obtained according to the following Calculation Formula 2:

$$\text{Residual stress ratio }(Y) = (RS_1/RS_0)*100 \quad \text{[Calculation Formula 2]}$$

wherein
$RS_0$ is residual stress at any one point (t0) within 0.05 seconds after applying strain at 200% to the resin composition at 235° C., and
$RS_1$ is residual stress at any one point ($t_1$) between 0.05 seconds and 1.50 seconds after applying strain at 200% to the resin composition at 235° C.

* * * * *